(12) United States Patent
Kent et al.

(10) Patent No.: US 6,586,964 B1
(45) Date of Patent: Jul. 1, 2003

(54) DIFFERENTIAL TERMINATION WITH CALIBRATION FOR DIFFERENTIAL SIGNALING

(75) Inventors: Michael Kent, Austin, TX (US); Michael A. Nix, Buda, TX (US)

(73) Assignee: Xilinx, Inc., San Jose, CA (US)

( * ) Notice: Subject to any disclaimer, the term of this patent is extended or adjusted under 35 U.S.C. 154(b) by 11 days.

(21) Appl. No.: 10/013,438

(22) Filed: Dec. 10, 2001

(51) Int. Cl.[7] ............................................... B65H 23/18
(52) U.S. Cl. ......................................................... 326/30
(58) Field of Search ............................. 326/30, 83, 86, 326/90; 327/108, 362; 333/17.3; 710/100, 126

(56) References Cited

U.S. PATENT DOCUMENTS

| | | | |
|---|---|---|---|
| 5,955,911 A | | 9/1999 | Drost et al. |
| 5,977,796 A | * | 11/1999 | Gabara ........................ 326/86 |
| 6,064,224 A | * | 5/2000 | Esch et al. .................... 326/30 |
| 6,157,206 A | * | 12/2000 | Taylor et al. ................. 326/30 |
| 6,294,932 B1 | * | 9/2001 | Watarai ........................ 326/83 |

* cited by examiner

Primary Examiner—Michael Tokar
(74) Attorney, Agent, or Firm—H. C. Chan

(57) ABSTRACT

A system for calibrating an adjustable termination resistor for a low voltage differential signaling (LVDS) system is provided. The system includes an adjustable termination resistor located on a chip and a reference termination resistor located off the chip. A bias circuit coupled to the adjustable termination resistor and the reference termination resistor causes the same current to flow through the adjustable termination resistor and the reference termination resistor. A comparator is configured to compare a first voltage drop across the adjustable termination resistor and a second voltage drop across the reference termination resistor. A control circuit is coupled to receive an output signal from the comparator. If the output signal indicates that the adjustable termination resistor has a desirable value with respect to the reference termination resistor, then the control circuit stops the calibration operation. Otherwise, the control circuit modifies the adjustable termination resistor and repeats the calibration cycle.

30 Claims, 5 Drawing Sheets

DIFFERENTIAL TERMINATION WITH CALIBRATION FOR DIFFERENTIAL SIGNALING

FIELD OF THE INVENTION

The present invention relates to a low voltage differential signaling (LVDS) system having an internal, calibrated, differential termination.

RELATED ART

Many types of communications and consumer products require termination resistors for high-speed signals. For example, a low voltage differential signaling (LVDS) interface requires differential termination resistors to enable operation in the 1 Gb/second range. It would be desirable for these LVDS termination resistors to be maintained within the range of 90 to 120 Ohms, as specified by the various LVDS standards. However, the resistance of a fixed resistor may easily vary outside of this range with variations in process, voltage and temperature.

It would therefore be desirable to implement LVDS termination resistors on a chip, and to calibrate these LVDS termination resistors to have resistances within the specified 90–120 Ohm tolerance. It is important to note that single-ended calibrated resistor technology (wherein one end of the calibrated resistor or one end of the reference resistor is connected to a DC voltage source) generally cannot be used to calibrate a termination resistor having a differential input signal.

Having a true LVDS implementation with on-chip calibrated termination resistors would be of great value. In this case, external (off-chip) components for termination of high-speed signals will not be required, thereby reducing the cost of board implementation. In addition, the calibrated termination resistors would improve signal integrity. Moreover, a true LVDS implementation would exhibit reduced power consumption with respect to a single-ended implementation. It would further be desirable if the LVDS termination resistors remain calibrated during normal operation of the chip, taking into account variations in parameters such as process, voltage and temperature.

SUMMARY

Accordingly, the present invention provides a differential termination resistor that can be calibrated for use as a LVDS termination resistor. The LVDS termination resistor is implemented by an on-chip LVDS termination structure, which is calibrated against an external reference resistor. Calibration can be performed continuously to keep track of changes in temperature and supply voltage during normal operation of the device.

In one embodiment, a system for calibrating an adjustable termination resistor for an LVDS system is provided. The system includes an adjustable termination resistor located on a chip and a reference termination resistor located off the chip. A bias circuit coupled to the adjustable termination resistor and the reference termination resistor causes the same current to flow through the adjustable termination resistor and the reference termination resistor. The adjustable termination resistor is initially set to one end of its range of resistances. For example, the adjustable termination resistor can initially be set to its lowest resistance value. A comparator is configured to compare the voltage drop across the adjustable termination resistor with the voltage drop across the reference termination resistor. A control circuit is coupled to receive the comparator output signal. If the comparator output signal indicates that the voltage drop across the adjustable termination resistor is greater than the voltage drop across the reference termination resistor, then the control circuit stops the calibration operation. The control circuit then transmits a calibration word representative of the selected resistance of the adjustable termination resistor to control other adjustable termination resistors on the chip. However, if the output signal indicates that the voltage drop across the reference termination resistor is greater than the voltage drop across the adjustable termination resistor, then the control circuit increments the resistance of the adjustable termination resistor, and repeats the comparison operation. This process continues until the comparator determines that the voltage drop across the adjustable termination resistor is greater than the voltage drop across the reference termination resistor. At this time, the control circuit transmits a calibration word representative of the resistance of the adjustable termination resistor to control the other adjustable termination resistors on the device.

In another embodiment, calibration is performed by each of the LVDS termination structures on the chip, thereby increasing the accuracy of the resulting LVDS termination resistances. In this embodiment, the calibration of each of the LVDS termination structures is cycled, one at a time, wherein different LVDS termination structures are calibrated with the same external resistor during successive cycles.

In the present invention, power is reduced with respect to a single-ended termination because there is no current in the LVDS termination device, except for that caused by the LVDS signal. The present invention implements a true differential termination for LVDS or other similar interfaces that fall within the specifications of the different LVDS standards. To help accomplish this, the external reference resistor is selected to have a value near the mid-point of the 90 to 120 Ohm range. In a particular embodiment, the external reference resistor is selected to have a 102 Ohm range.

The present invention will be more fully understood in view of the following description and drawings.

DETAILED DESCRIPTION

Figure 1:
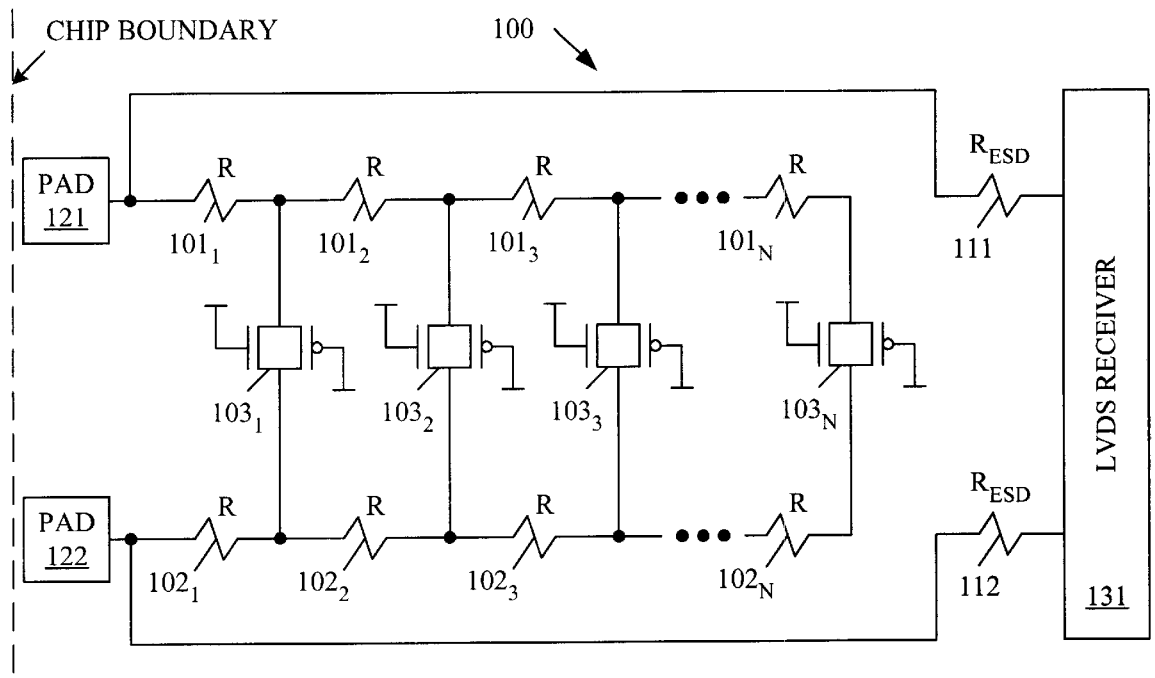
FIG. 1 is a circuit diagram of an LVDS termination resistor circuit in accordance with one embodiment of the present invention.

FIG. 1 is a circuit diagram of an LVDS termination resistor circuit 100 in accordance with one embodiment of the present invention. LVDS termination resistor circuit 100 includes resistors $101_1$–$101_N$, $102_1$–$102_N$ and 111–112, CMOS transfer gates $103_1$–$103_N$, signal pads 121–122 and LVDS receiver circuit 131. Each of resistors $101_1$–$101_N$ and $102_1$–$102_N$ is formed by a passive resistor material such as an n-well region or a non-salicided p+ type polysilicon region. Each of transfer gates $103_1$–$103_N$ is formed by an n-channel transistor and a p-channel transistor connected in parallel. A control circuit (not shown) is coupled to the gates of the transistors in transfer gates $103_1$–$103_N$. As described in more detail below, the control circuit selectively applies control voltages to enable one or more of the transfer gates $103_1$–$103_N$. The control circuit enables the transfer gates in a manner that causes the resistive path between pads 121 and 122 to match the resistance of an external resistor (not shown).

Figure 2:
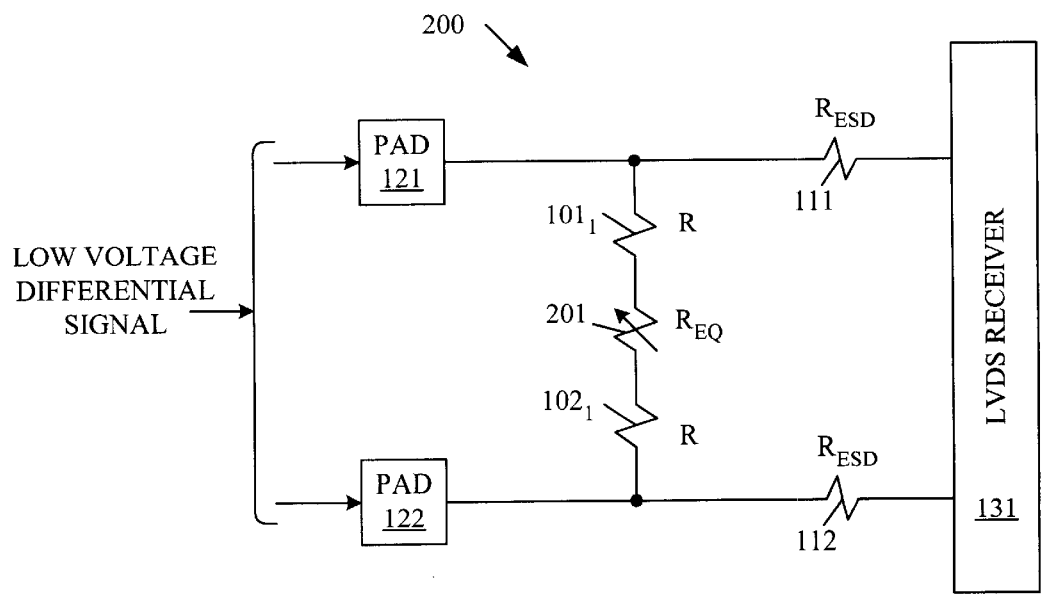
FIG. 2 is a circuit diagram illustrating an equivalent circuit for the LVDS termination resistor circuit of FIG. 1 in accordance with one embodiment of the present invention.

In a particular embodiment, the external resistor has a resistance of 105 Ohms, which represents the middle of the range of the LVDS standard (i.e., 90–120 Ohms). In this embodiment, the calibration routine determines which of the CMOS transfer gates $103_1$–$103_N$ must be turned on to achieve a resistance closest to 105 ohms between the two pads 121–122. After the calibration routine has been completed, LVDS termination resistor circuit 100 reduces to the equivalent LVDS termination resistor circuit 200 illustrated in FIG. 2, wherein resistor 201 represents the equivalent resistance $R_{EQ}$ of the path or paths created by turning on one or more of transfer gates $103_1$–$103_N$. In the present example, the combined resistance of resistors $101_1$, $102_1$ and 201 is approximately equal to 105 ohms.

In the described embodiment, the n-channel transistor in each of transfer gates $103_1$–$103_N$ has a width-to-length ratio of 50/0.34, and the p-channel transistor in each of transfer gates $103_1$–$103_N$ has a width-to-length ratio of 200/0.34. In this case, SPICE simulations were run to show the variation in resistance in the transfer gates for variations in temperature and voltage. In these SPICE simulations, a common mode voltage variation of the input voltage from 0.05 to 2.35 Volts, and a differential voltage variation between 100 mV and 600 mV was assumed. Note that the common mode voltage is defined as the average voltage of a differential signal. In addition, a temperature variation from 0° C. to 125° C. was assumed. Under these conditions, the corner conditions of the SPICE simulations show that the resistances of the CMOS transfer gates $103_1$–$103_N$ vary across voltage and temperature from 89.3 ohms to 115.1 ohms. This SPICE simulation indicates that it is feasible to achieve the required resistance tolerances across voltage and temperature, thereby potentially eliminating the need for repeated calibration, as required by some single-ended termination technology.

In general, each of the CMOS transfer gates $103_1$–$103_N$ has a positive temperature coefficient. That is, as the temperature increases, the resistance of the transfer gates increases. In one embodiment, resistors $101_1$–$101_N$ and $102_1$–$102_N$ are fabricated using unsalicided p+ polysilicon, which has a very small negative temperature coefficient. That is, as the temperature increases, the resistance of resistors $101_1$–$101_N$ and $102_1$–$102_N$ will decrease. These opposing temperature coefficients will help reduce variations in resistance with respect to temperature variations. As a result, this combination could obviate the need for continuous calibration.

In a particular embodiment, resistors $101_1$ and $102_1$ are each selected to have a nominal resistance of about 30 ohms. In this embodiment, resistors $101_1$ and $102_1$ provide 60 Ohms of the desired 105 Ohm termination resistance, or more than half the required termination resistance. Advantageously, the transfer gates $103_1$–$103_N$, which exhibit non-linear variations in resistance, are required to provide less than half of the required termination resistance. In one embodiment, each of resistors $101_2$–$101_N$ and $102_2$–$102_N$ has a resistance of about 30 Ohms. In another embodiment, resistors $101_2$–$101_N$ and $102_2$–$102_N$ are eliminated, and the resistances of transfer gates $103_1$–$103_N$ are used to provide the equivalent resistance $R_{EQ}$ of resistor 201.

Figure 3:
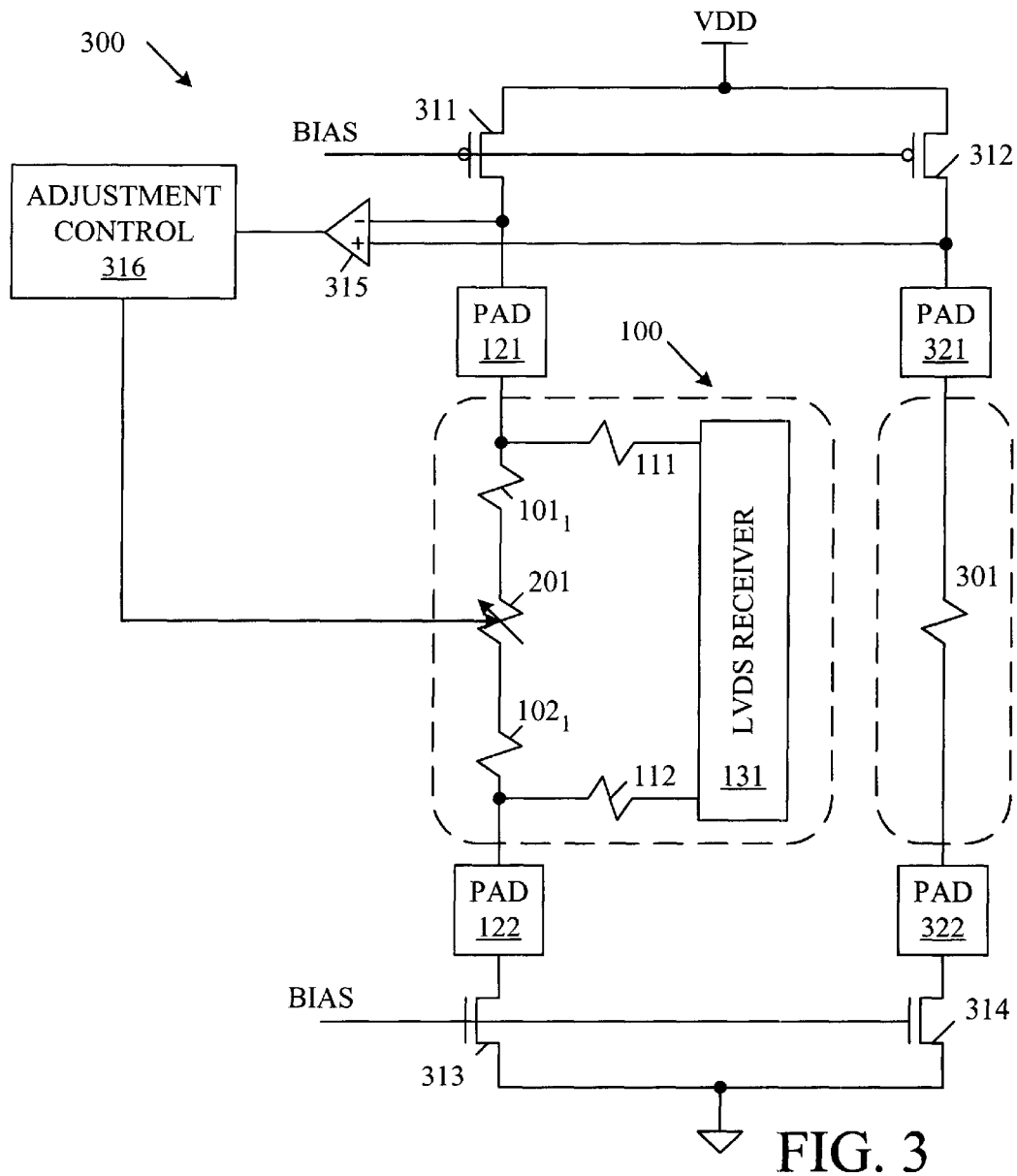
FIG. 3 is a circuit diagram of a calibration circuit circuit used to calibrate the LVDS termination circuit of FIG. 1 with an off-chip resistor in accordance with one embodiment of the present invention.

FIG. 3 is a circuit diagram of a calibration circuit 300 circuit used to calibrate LVDS termination circuit 100 with an off-chip 105 Ohm resistor 301. In addition to termination circuit 100 and external resistor 301, calibration circuit 300 includes p-channel transistors 311–312, n-channel transistors 313–314, comparator 315, adjustment control circuit 316, and pads 321–322. A bias voltage (BIAS) is applied to the gates of transistors 311–314, such that the current flowing through termination circuit 100 is equal to the current flowing through 105 Ohm reference resistor 301. Comparator 315 compares the voltage drop across reference resistor 301 with the voltage drop across resistors $101_1$, 201 and $102_1$.

During calibration, adjustment control circuit 316 initially increments resistor 201 in steps until the output of comparator 315 switches state, indicating that the on-chip resistors $101_1$, 201 and $102_1$ exhibit a greater resistance than the 105 Ohm off-chip reference resistor 301. Parallel transfer gates that make up resistor 201 are then sequentially enabled until the resistance of on-chip resistors $101_1$, 201 and $102_1$ becomes less than the resistance of off-chip reference resistor 301. At this time, the output signal provided by comparator 315 switches state again. Upon detecting this change of state, adjustment control 316 maintains the resistance of adjustable resistor 201, thereby completing the initial calibration process for circuit 100. Additional changes can be made to the resistance of resistor 201 if the resistance of resistor 301 changes during normal operation of the system. Information concerning the enabled transfer gates in LVDS termination structure 100 can be transmitted to other LVDS termination structures on the same device. These other LVDS termination structures can then be configured by enabling the same transfer gates, thereby properly selecting the termination resistances of these other LVDS termination structures.

Figure 4:
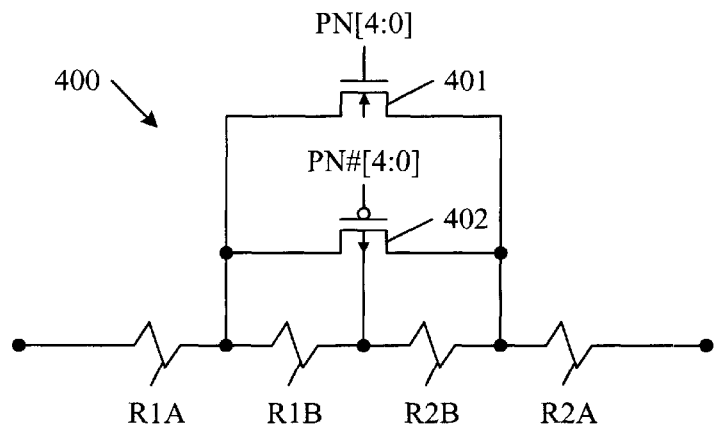
FIG. 4 is a circuit diagram of an LVDS termination structure in accordance with another embodiment of the present invention.

FIG. 4 is a circuit diagram of an LVDS termination structure 400 in accordance with another embodiment of the present invention. LVDS termination structure 400 includes four series-connected resistors R1A, R1B, R2B and R2A, an n-channel transistor structure 401, and a p-channel transistor structure 402. Transistor structures 401 and 402 are connected in parallel with resistors R1B and R2B. The bulk of p-channel transistor structure 402 is coupled to the center-tap node where resistors R1B and R2B are joined.

LVDS termination structure 400 is intended to meet a number of different standards. The union of these standards (overlap) is 0.05 to 2.4 Volts common-mode voltage, and 90 to 120 Ohm termination resistance value. Also, the differential signal swing can be up to 0.6 Volts peak-to-peak.

To achieve an impedance that meets these requirements, LVDS termination structure 400 can be adjusted to match an external reference resistor, and the calibration data used for LVDS termination structure 400 can then be transmitted to control other LVDS termination structures. In this case, proper termination of the other LVDS termination structures is assured by device matching. By careful sizing of the components, using 32 steps in the calibration procedure, and having no more than ±5% impedance mismatch between the various LVDS termination structures on the chip, a 90–120 Ohm requirement can be met for a 0.05 to 2.4 volt common mode voltage.

Figure 5A:
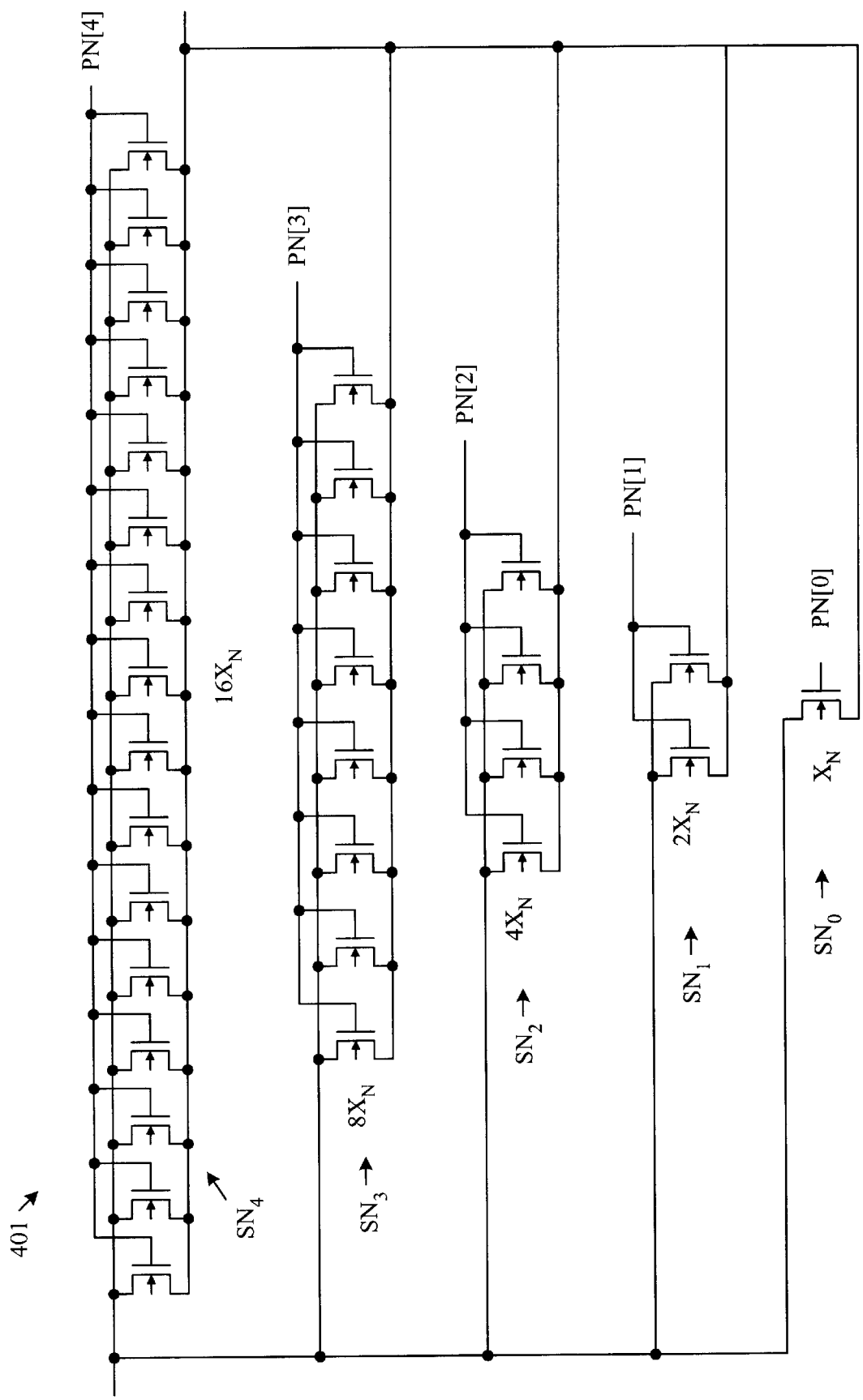
FIG. 5A is a circuit diagram of an n-channel transistor structure of the LVDS termination structure of FIG. 4 in accordance with one embodiment of the present invention.

FIG. 5A is a circuit diagram of n-channel transistor structure 401 in accordance with one embodiment of the present invention. N-channel transistor structure 401 includes five segments of n-channel transistors $SN_0$–$SN_4$ connected in parallel. Segment $SN_4$ includes 16 parallel connected n-channel transistors, segment $SN_3$ includes 8 parallel connected n-channel transistors, segment $SN_2$ includes 4 parallel connected n-channel transistors, segment $SN_1$ includes 2 parallel connected n-channel transistors, and segment $SN_0$ includes 1 n-channel transistor. The gates of the transistors in each of segments $SN_4$–$SN_0$ are commonly connected. Each of segments $SN_4$–$SN_0$ is coupled to receive a corresponding bit of impedance control signal PN[4:0]. All of the n-channel transistors in structure 401 are identical. Thus, segments $SN_4$, $SN_3$, $SN_2$, $SN_1$ and $SN_0$ exhibit on-conductances of $16X_N$, $8X_N$, $4X_N$, $2X_N$ and $X_N$ Siemens, respectively.

Figure 5B:
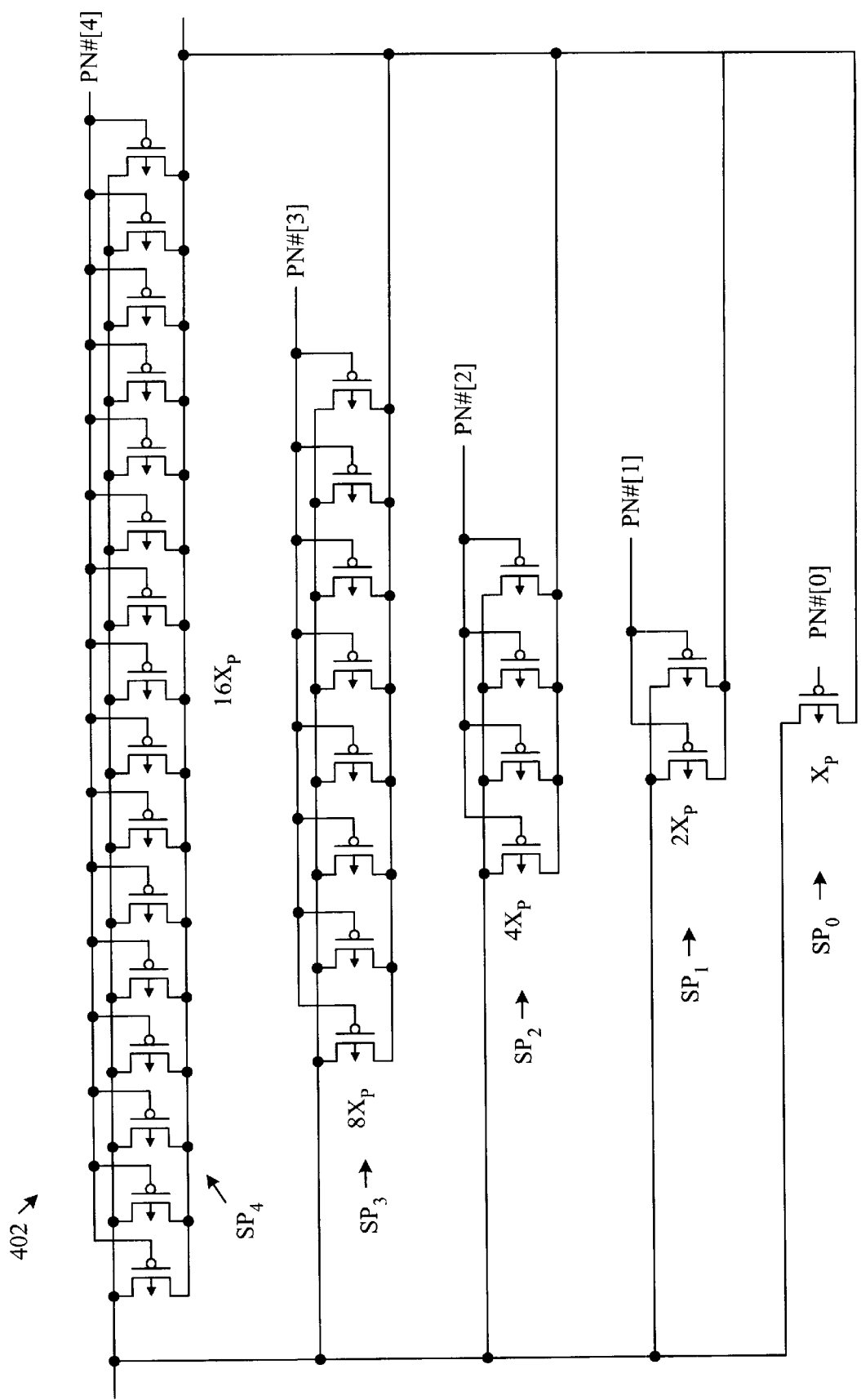
FIG. 5B is a circuit diagram of a p-channel transistor structure of the LVDS termination structure of FIG. 4 in accordance with one embodiment of the present invention.

FIG. 5B is a circuit diagram of p-channel transistor structure 402 in accordance with one embodiment of the present invention. P-channel transistor structure 402 is similar to n-channel transistor structure 401. Thus, p-channel transistor structure 402 includes five segments of p-channel transistors $SP_0$–$SP_4$ connected in parallel. Segments $SP_4$, $SP_3$, $SP_2$, $SP_1$ and $SP_0$ include 16, 8, 4, 2 and 1 parallel connected p-channel transistors, respectively. The gates of the transistors in each of segments $SP_4$–$SP_0$ are commonly connected. Each of segments $SP_4$–$SP_0$ is coupled to receive a corresponding inverted bit of impedance control signal PN[4:0] (i.e., PN#[4:0]). Thus, when a segment ($SN_N$) of n-channel transistor structure 401 is turned on, a corresponding segment ($SP_N$) of p-channel transistor structure 402 is turned on. All of the p-channel transistors in structure 402 are identical. Thus, segments $SP_4$, $SP_3$, $SP_2$, $SP_1$ and $SP_0$ exhibit on-conductances of $16X_P$, $8X_P$, $4X_P$, $2X_P$ and $X_P$ Siemens, respectively.

N-channel transistor structure 401 and p-channel transistor structure 402 form a 5-bit digital-to-analog converter (DAC) that is controlled by a calibration circuit, as described in more detail below. In general, if the PN[4:0] control signal is initially set to have a value of "11111" (PN#[4:0]= "00000"), all of the transistors in structures 401 and 402 are turned on, thereby providing a conductance of $31X_N$ Siemens plus $31X_P$ Siemens (or a resistance of $1/31X_N$ Ohms in parallel with a resistance of $1/31X_P$ Ohms) As the PN[4:0] control signal is decremented in a binary count order, the conductances of structures 401 and 402 sequentially decrease, by a conductance of one $X_N$ and one $X_P$, respectively, per count. Stated another way, the resistances of structures 401 and 402 increase as the PN[4:0] signal is decremented. This increase in resistance is referred to as the transistor step-size. Note that not all transistor step-sizes are the same.

The resistor sizes (R1A, R1B, R2A, R2B) are chosen such that at the lowest operating temperature and the lowest process starting value (i.e., the lowest resistance values within the process window), the impedance of LVDS resistor structure 400 is about 100 ohms with all of the transistors in structures 401 and 402 turned off. The size of the p and n channel transistors in structures 401 and 402 are chosen such that at the highest temperature, the lowest operating voltage, and the highest process starting value, the impedance of LVDS resistor structure is just under 100 ohms with all of the transistors in structures 401 and 402 turned on. In the described embodiment, resistors R1A and R2A have the same resistance, and resistors R1B and R2B have the same resistance. However, the ratio of the size of resistors R1A/R2A to the size of resistors R1B/R2B is variable. The ratio of the size of the p-channel transistors in structure 402 to the size of the n-channel transistors in structure 401 is also variable. These ratios can be selected by using SPICE simulations to get the optimal performance. The resistor ratio is important in determining the calibration step size. The transistor ratio is important in determining the impedance variation with common-mode voltage change.

For a conventional 0.18 micron process (such as the 0.18 micron process provided by United Microelectronics Corp. (UMC)), the following device sizes can be used in accordance with one embodiment of the present invention.

Resistors R1A and R2A are both formed by N+ type polycrystalline silicon regions having a length-to-width ratio of 4/22. Resistors R1B and R2B are both formed by N+ type polycrystalline silicon regions having a length-to-width ratio of 7/20. As a result, the ratio of the resistance of resistors R1A/R2A to the resistance of resistors R1B/R2B is 1.926:1. In the described example, the nominal resistance value of resistor R1A (and R2A) is about 22.9 Ohms, and the nominal resistance value of resistor R1B (and R2B) is about 44.1 Ohms.

In the described example, each of the p-channel transistors in structure 402 has a width-to-length ratio of 5.52/0.34, and each of the n-channel transistors in structure 401 has a width-to-length ratio of 1.88/0.34.

In the described example, LVDS termination structure 400 will exhibit a low resistance of 101.9 Ohms at the lowest operating temperature (−40° C.) and the lowest process starting resistance value, when all of the transistors in structures 401 and 402 are turned off.

In the described example, LVDS termination structure 400 will exhibit a lowest resistance of about 99 ohms at the highest operating temperature (125° C.), the lowest operating voltage (3.0 Volts=3.3 Nominal $V_{DD}$−10%), the highest process starting resistance value and the worst case (weakest) transistor processing, when all of the transistors in structures 401 and 402 are turned on.

The maximum variation in the resistance of LVDS termination structure 400 with respect to variations in common-mode voltage occurs at the following corners.

The first corner condition (ff) will now be described. When the process provides fast p-channel transistors and fast n-channel transistor within the process window, the operating temperature is at a low value of −40° C., the supply voltage is 3.6 Volts (3.3 Nominal $V_{DD}$+10%), ten transistors are turned on in each of transistor structures 401 and 402, and the process provides resistors (R1A, R1B, R2A and R2B) having worst case high resistances within the process window, then LVDS termination structure 400 will exhibit the following resistances at the following voltages.

TABLE 1

| Resistance of LVDS Termination Structure 400 | Input Common-Mode Voltage |
|---|---|
| 103.5 Ohms | 2.4 V |
| 100.3 Ohms | 1.8 V |
| 105.5 Ohms | 1.0 V |
| 109.7 Ohms | 0.6 V |
| 107.6 Ohms | .05 V |

Note that in this simulation, the resistance of LVDS termination structure 400 is controlled to have a value about half way between the allowable low resistance of 90 Ohms and the allowable high resistance of 120 Ohms when the input common mode voltage is 1 Volt.

At this corner condition, the maximum variation in resistance is 9.4 Ohms, between the 1.8 Volt condition and the 0.6 Volt condition. The resistance of 100.3 Ohms at the 1.8 Volt condition is 5.2 Ohms less than the 105.5 Ohm resistance at the 1.0 Volt condition. The resistance of 109.7 Volts at the 0.6 Volt condition is 4.2 Ohms greater than the 105.5 Ohm resistance at the 1.0 Volt condition.

The second corner condition (ss) will now be described. When the process provides slow p-channel transistors and slow n-channel transistor within the process window, the operating temperature is at a low value of −40° C., the supply voltage is 3.0 Volts (3.3 Nominal $V_{DD}$−10%), sixteen transistors are turned on in each of transistor structures 401 and 402, and the process provides resistors (R1A, R1B, R2A and R2B) having worst case high resistances within the process window, then LVDS termination structure 400 will exhibit the following resistances at the following voltages.

TABLE 2

| Resistance of LVDS Termination Structure 400 | Input Common-Mode Voltage |
|---|---|
| 104.6 Ohms | 2.4 V |
| 110.0 Ohms | 1.8 V |
| 106.0 Ohms | 1.0 V |
| 100.3 Ohms | .05 V |

Again, the resistance of LVDS termination structure 400 is controlled to have a value about half way between the allowable low resistance of 90 Ohms and the allowable high resistance of 120 Ohms when the input common mode voltage is 1 Volt.

At this corner condition, the maximum variation in resistance is 9.7 Ohms, between the 1.8 Volt condition and the 0.05 Volt condition. The resistance of 110 Ohms at the 1.8 Volt condition is 4 Ohms greater than the 106 Ohm resistance at the 1.0 Volt condition. The resistance of 100.3 Volts at the 0.05 Volt condition is 5.7 Ohms less than the 105.5 Ohm resistance at the 1.0 Volt condition.

The maximum step size of transistor structures 401–402 during calibration at these two corner conditions is 2.9 ohms and 1.6 ohms for the first and second corner conditions, respectively.

The maximum step size of transistor structures 401–402 during calibration at any corner condition is 8.5 Ohms. However, the common-mode variation is small when the step size is this large, because only one section is enabled in transistor structures 401 and 402. In the described embodiment, the common-mode variation is 0.7 Ohms when the maximum step size is 8.5 Ohms. This step size is represented by sections $SP_0$ and $SN_0$ in FIGS. 5A–5B.

In the present example, it is determined that an external reference resistor having a resistance of 102 Ohms allows LVDS termination structure 400 to provide a termination resistance in the range of 90 to 120 Ohms under all conditions. This determination is made as follows.

For a 102 Ohm reference resistor, the maximum resistance provided by LVDS termination structure 400 will be:

(102+8.5+1) Ohms×1.05+0.7 Ohms=117.775 Ohms, where 102 Ohms is the resistance of the reference resistor, 8.5 Ohms is the maximum step size, 1 Ohm offset is attributed to the comparator, a mis-match of 5% is assumed for the elements of the various LVDS termination structures located across the chip, and a common mode variation of 0.7 Ohms corresponds with a maximum step size of 8.5 Ohms. The maximum resistance of 117.775 Ohms falls within the required range of 90–120 Ohms.

For a 102 Ohm reference resistor, the minimum resistance provided by LVDS termination structure 400 will be:

(102−1) Ohms×0.95−5.7 Ohms=90.25 Ohms, where 102 Ohms is the resistance of the reference resistor, 1 Ohm offset is attributed to the comparator, a mis-match of −5% is assumed for the elements of the various LVDS termination structures located across the chip, and a common mode variation of −5.7 Ohms is assumed. (See, the worst case negative variation in Table 2.) The minimum resistance of 90.25 Ohms falls within the required range of 90–120 Ohms. Note that the transistor step size is not included in the minimum resistance calculation, because the calibration procedure operates to make the termination impedance larger than the reference resistor. Thus, including the step size would only raise the value of the minimum resistance.

Figure 6:
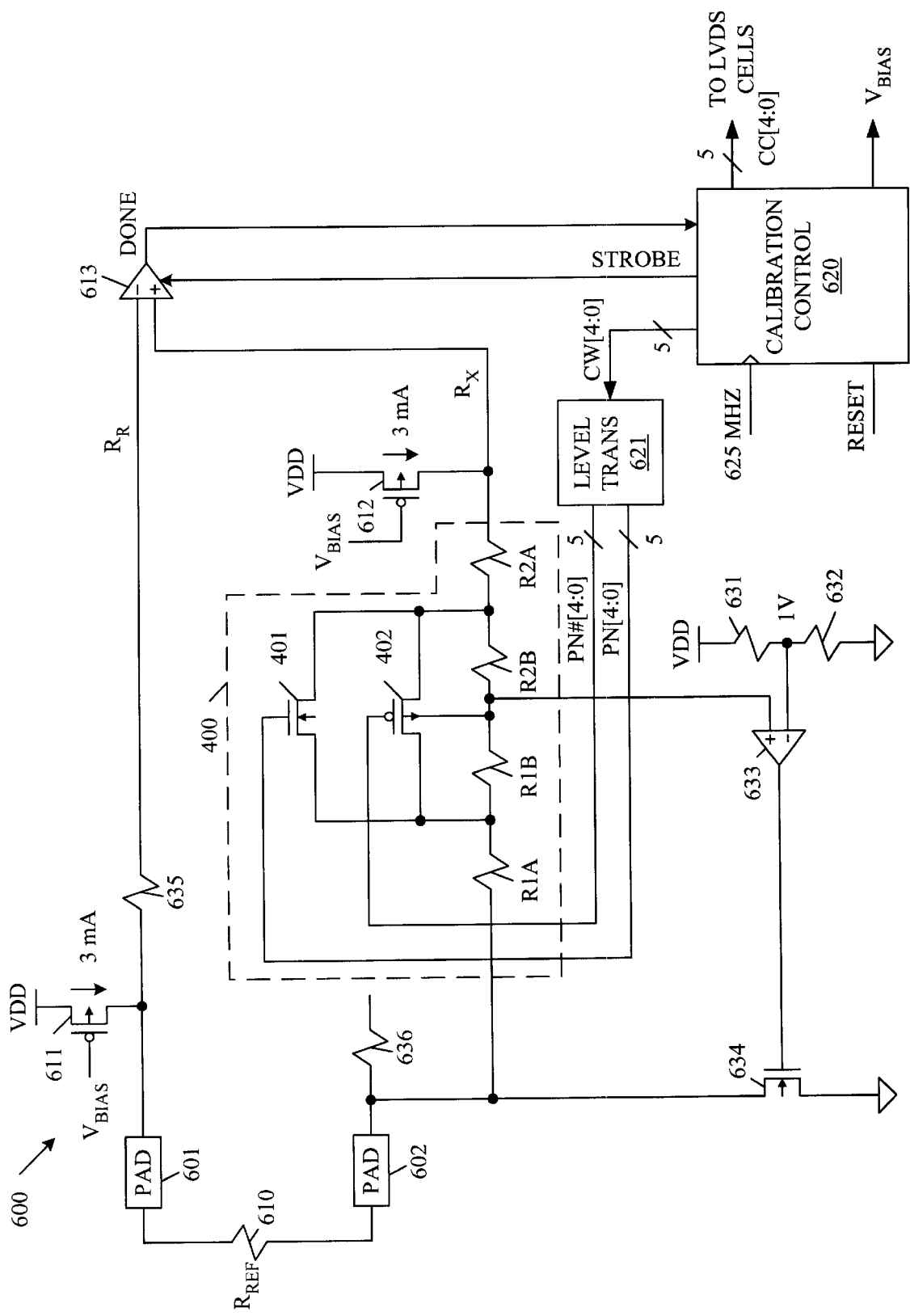
FIG. 6 is a circuit diagram illustrating a calibration circuit used in connection with the LVDS termination structure of FIG. 4 in accordance with one embodiment of the present invention.

FIG. 6 is a circuit diagram illustrating a calibration circuit 600 used in connection with LVDS termination structure 400 in accordance with one embodiment of the present invention. In addition to LVDS termination structure 400, calibration circuit 600 includes pads 601–602, external reference resistor 610, p-channel transistors 611–612, comparator 613, calibration control unit 620, level translator 621, resistors 631–632, operational amplifier 633, n-channel transistor 634 and resistors 635 and 636. Resistor 636 is not connected in the present embodiment, and therefore has no affect on LVDS calibration structure 600.

Resistor 635 is connected between pad 601 and an input terminal of comparator 613. Similarly, LVDS termination structure 400 is connected between pad 602 and an input terminal of comparator 613. Reference resistor 610 is connected across pads 601 and 602. Pad 602 is also coupled to ground through n-channel transistor 634. P-channel transistor 611 is connected to pad 601, and p-channel transistor 612 is connected to the external end of resistor R2A of LVDS termination structure 400. P-channel transistors 611 and 612 are identical transistors that are both biased by the same voltage $V_{BIAS}$. As a result, the same current flows through transistors 611 and 612. In the described embodiment, $V_{BIAS}$ is selected such that a current of about 3 mA current flows through each of transistors 611 and 612. The current flowing through transistor 611 is routed through reference resistor 610 and n-channel transistor 634. The resulting voltage drop across reference resistor 610 is applied to an input terminal of comparator 613 as signal $R_R$. The current flowing through transistor 612 is routed through LVDS termination structure 400 and n-channel transistor 634. The resulting voltage drop across LVDS termination structure 400 is applied to an input terminal of comparator 613 as signal $R_X$.

Resistors 631 and 632 form a voltage divider circuit, which provides a nominal voltage of about 1 Volt to operational amplifier 633 in response to a 3.3 Volt $V_{DD}$ supply voltage. The other input terminal of operational amplifier 633 is coupled to the center-tap node coupling resistors R1B and R2B. The output terminal of operational amplifier 633 drives the gate of n-channel transistor 634. This feedback circuit maintains the center-tap node of LVDS termination structure at a nominal voltage of about 1 Volt, advantageously reducing common mode error. Because the center-tap node is also coupled to the bulk (n-well) region of p-channel transistor structure 402, the common mode variation of this transistor structure 402 is also reduced.

LVDS termination structure 400 is calibrated in the following manner. Calibration control unit 620 initially transmits an initial 5-bit calibration word CW[4:0] having a value of "11111" to level translator 621. In response, level translator 621 generates a PN[4:0] value of "11111" and a PN#[4:0] value of "00000". As a result, all of the n-channel transistors in structure 401 and all of the p-channel transistors in structure 402 are initially turned on, such that structures 401 and 402 exhibit conductances of $31X_N$ and $31X_P$, respectively. Comparator 613 then compares the resulting voltages $R_X$ and $R_R$. Because all of the transistors in structures 401–402 are turned on, LVDS termination structure 400 exhibits the lowest possible resistance. Thus, it is expected that the voltage drop $R_X$ would be less than the voltage drop $R_R$. If $R_X$ is indeed less then $R_R$, then comparator 613 (when enabled) will provide an output signal DONE having a logic low state to identify this condition. However, if $R_X$ happens to be greater than $R_R$, then comparator 613 (when enabled) will provide an output signal DONE having a logic high state to identify this condition. Calibration control unit 620 asserts a logic high STROBE signal after the $R_R$ and $R_X$ signals have had adequate time to settle. The logic high STROBE signal enables comparator 613 to provide the DONE signal to calibration control unit 620. If calibration control unit 620 detects a DONE signal having a logic high state, then calibration control unit 620 stops the current calibration operation, and transmits a calibration control signal CC[4:0] having a logic "11111" value to other LVDS termination circuits (not shown) on the chip. In response, each of these other LVDS termination circuits configures their corresponding transistor structures in the same manner as transistor structures 401 and 402. Thus, upon receiving a calibration control signal CC[4:0] having a value of "11111", each of these other LVDS termination circuits will turn on all of the n-channel and p-channel transistors in their corresponding transistor structures. Each of these other LVDS termination circuits is connected in parallel across two pads, and is also connected to a corresponding LVDS receiver.

If calibration control unit 620 detects a DONE signal having a logic low value, then calibration control unit 620 de-asserts the STROBE signal, and decrements the calibration word CW[4:0] by one, thereby providing a value of "11110". In response, level translator 621 generates a PN[4:0] value of "11110" and a PN#[4:0] value of "00001". As a result, the n-channel transistors in segments $SN_4$–$SN_1$ and $SP_4$–$SP_1$ are turned on and the transistors in segments $SN_0$ and $SP_0$ are turned off. As a result, structures 401 and 402 exhibit conductances of $30X_N$ and $30X_P$, respectively. That is, the resistances of transistor structures 401 and 402 increase by one step during the second calibration cycle, thereby increasing the resistance of LVDS termination structure 400. Assuming that all other conditions remain the same, the voltage $R_X$ increases. Calibration control unit 620 again asserts the STROBE signal after the $R_X$ and $R_R$ voltages have had sufficient time to settle. If the DONE signal has a logic high value, then calibration control unit 620 stops the current calibration operation, and transmits a calibration control signal CC[4:0] having a value of "11110" to control the other LVDS termination circuits. In response, these other LVDS termination circuits configure their corresponding transistor structures in the same manner as transistor structures 401 and 402. If the DONE signal has a low value, then the calibration operation proceeds in the above-described manner, with calibration control logic 620 decrementing the calibration word CW[4:0] by one for each successive cycle, until the $R_X$ voltage exceeds the $R_R$ voltage. If the calibration operation reaches a calibration word CW[4:0] equal to "00000", such that all of the transistors in transistor structures 401–402 are turned off, then this setting is used, regardless of the state of the DONE signal.

The calibration operation can be performed once, or repeated during normal operation of the device. If repeated, the calibration operation may be repeated continuously, or periodically. In one embodiment, the calibration operation is repeated with a 50/50 duty cycle to save power. For example, a calibration operation can be performed during every other 100 micro-second period. All of the bias voltages are turned off between active calibration operations, thereby saving power.

Although the invention has been described in connection with several embodiments, it is understood that this invention is not limited to the embodiments disclosed, but is capable of various modifications, which would be apparent to a person skilled in the art. For example, although the described examples described initially setting the LVDS termination structure to the minimum resistance, and then incrementally increasing this resistance, it is possible to initially set the LVDS termination structure to the maximum resistance, and then incrementally decrease this resistance. Moreover, although the transistor structures in FIGS. 5A and 5B are described as having binary-weighted conductances, it is understood that in other embodiments, these transistor structures can be modified to have linearly-weighted conductances. Thus, the invention is limited only by the following claims.

What is claimed is:

1. A method of calibrating an adjustable termination resistor for a low voltage differential signaling (LVDS) system, the method comprising:
   comparing the resistance of the adjustable termination resistor against the resistance of an external reference resistor; and
   adjusting the resistance of the adjustable termination resistor in response to the resistance of the external resistor.

2. The method of claim 1, wherein the step of comparing comprises:
   biasing the external reference resistor and the adjustable termination resistor in the same manner;
   comparing a voltage drop across the external reference resistor and a voltage drop across the adjustable termination resistor; and
   adjusting the resistance of the adjustable termination resistor in response to the step of comparing.

3. The method of claim 2, wherein the biasing step comprises:
   routing a first current through the external reference resistor; and
   routing a second current through the adjustable termination resistor, wherein the first current is equal to the second current.

4. The method of claim 2, wherein the comparing step comprises:
  providing a first voltage representative of the voltage drop across the adjustable termination resistor to a first input terminal of a comparator; and
  providing a second voltage representative of the voltage drop across the external reference resistor to a second input terminal of the comparator; and
  generating an output signal with the comparator that indicates whether the first voltage is greater than the second voltage.

5. The method of claim 1, wherein the adjustable termination resistor is adjusted by selectively enabling and disabling transistors within the adjustable termination resistor.

6. The method of claim 1, further comprising biasing a mid-point of the adjustable termination at a predetermined voltage level.

7. The method of claim 1, wherein the steps of comparing and adjusting are performed during a first half of a duty cycle, and a second half of the duty cycle is idle.

8. The method of claim 1, wherein the step of adjusting the resistance comprises enabling and disabling transistors having binary-weighted resistances.

9. The method of claim 1, wherein the step of adjusting the resistance comprises enabling and disabling transistors having linearly-weighted resistances.

10. The method of claim 1, further comprising:
  generating a control signal representative of the adjusted resistance of the adjustable termination resistor; and
  transmitting the control signal to adjust the resistance of other adjustable termination resistors.

11. A system for calibrating an adjustable termination resistor for a low voltage differential signaling (LVDS) system, the system comprising:
  an adjustable LVDS termination resistor located on a chip;
  a reference termination resistor located off the chip;
  a bias circuit coupled to the adjustable termination resistor and the reference termination resistor, wherein the bias circuit causes the same current to flow through the adjustable termination resistor and the reference termination resistor;
  a comparator configured to compare a first voltage drop across the adjustable termination resistor and a second voltage drop across the reference termination resistor; and
  a control circuit coupled to receive an output signal from the comparator, and in response, provide an adjustment control signal to adjust the resistance of the adjustable termination resistor.

12. The system of claim 11, further comprising:
  a first pair of pads on the chip, wherein the adjustable termination resistor is coupled between the first pair of pads; and
  a second pair of pads on the chip, wherein the reference termination resistor is coupled between the second pair of pads.

13. The system of claim 11, wherein the adjustable termination resistor comprises:
  a first resistor having a first terminal coupled to a first pad;
  a second resistor having a first terminal coupled to a second pad; and
  a plurality of transistors connected in parallel between a second terminal of the first resistor and a second terminal of the second resistor.

14. The system of claim 13, wherein the first resistor and the second resistor together exhibit a resistance more than half of the resistance of the reference termination resistor.

15. The system of claim 13, wherein the control circuit controls which transistors in the plurality of transistors are turned on.

16. The system of claim 13, wherein the control circuit is coupled to provide the adjustment control signal to adjust the resistances of a plurality of adjustable termination resistors.

17. The system of claim 13, wherein the adjustable termination resistor has a resistance that is adjustable between 90 and 120 Ohms.

18. The system of claim 13, wherein the plurality of transistors are configured to form a plurality of transfer gates, each of the transfer gates comprising a p-channel transistor and an n-channel transistor coupled in parallel.

19. The system of claim 11, wherein the adjustable termination resistor comprises:
  a first resistor, a second resistor, a third resistor and a fourth resistor connected in series, wherein the first resistor and the fourth resistor are located at the ends of the series connection;
  a set of p-channel transistors connected in parallel with the second and third resistors; and
  a set of n-channel transistors connected in parallel with the second and third resistors.

20. The system of claim 19, wherein the first, second, third and fourth resistors comprise n-type polycrystalline silicon.

21. The system of claim 19, wherein the set of p-channel transistors exhibit binary weighted resistances when turned on.

22. The system of claim 19, wherein the set of n-channel transistors exhibit binary weighted resistances when turned on.

23. The system of claim 19, further comprising a bias circuit coupled to a node between the second and third resistors, the bias circuit maintaining the node at a predetermined voltage.

24. The system of claim 23, wherein the bias circuit is further coupled a bulk region of the set of p-channel transistors, wherein the bias circuit maintains the bulk region of the p-channel transistors at the predetermined voltage.

25. The system of claim 23, wherein the predetermined voltage is less than a $V_{DD}$ supply voltage.

26. The system of claim 23, wherein the control circuit is configured to control the p-channel transistors and the n-channel transistors that are turned on.

27. The system of claim 23, further comprising:
  a first pad, wherein the first resistor and the reference termination resistor are coupled to the first pad;
  a second pad, wherein the reference termination resistor is coupled to the second pad;
  a first current source coupled to the fourth resistor; and
  a second current source, identical to the first current source, coupled to the second pad.

28. The system of claim 27, wherein the comparator is coupled to the second pad and the fourth resistor.

29. The system of claim 19, wherein the resistance of the first and fourth resistors is less than the resistance of the second and third resistors.

30. The system of claim 29, wherein the resistance of the first and fourth resistors is about half the resistance of the second and third resistors.

* * * * *